US009864863B2

(12) United States Patent
Amit et al.

(10) Patent No.: US 9,864,863 B2
(45) Date of Patent: *Jan. 9, 2018

(54) REDUCING DECRYPTION LATENCY FOR ENCRYPTION PROCESSING

(71) Applicant: INTERNATIONAL BUSINESS MACHINES CORPORATION, Armonk, NY (US)

(72) Inventors: Jonathan Amit, Omer (IL); Amir Lidor, Binyamina (IL); Sergey Marenkov, Yehud (IL); Rostislav Raikhman, Rishon-leZion (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 229 days.

This patent is subject to a terminal disclaimer.

(21) Appl. No.: 14/252,344

(22) Filed: Apr. 14, 2014

(65) Prior Publication Data
US 2014/0250305 A1    Sep. 4, 2014

Related U.S. Application Data

(63) Continuation of application No. 13/523,613, filed on Jun. 14, 2012, now Pat. No. 8,726,039.

(51) Int. Cl.
G06F 21/60    (2013.01)
G09C 1/00     (2006.01)

(52) U.S. Cl.
CPC ............. G06F 21/602 (2013.01); G09C 1/00 (2013.01); H04L 2209/125 (2013.01)

(58) Field of Classification Search
CPC ...................................................... G06F 21/52
See application file for complete search history.

(56) References Cited

U.S. PATENT DOCUMENTS

2006/0235876 A1*  10/2006  Plouffe, Jr. ........... G06F 9/4435
2008/0155197 A1*   6/2008  Li ......................... G06F 9/4843
                                                               711/130

(Continued)

OTHER PUBLICATIONS

Ebrahimi, Eiman, et al. "Fairness via source throttling: a configurable and high-performance fairness substrate for multi-core memory systems." ACM Sigplan Notices. vol. 45. No. 3. ACM, 2010.*

(Continued)

Primary Examiner — Yin-Chen Shaw
Assistant Examiner — Michael Guirguis
(74) Attorney, Agent, or Firm — Griffiths & Seaton PLLC

(57) ABSTRACT

In a compression processing storage system, using a pool of encryption processing cores, the encryption processing cores are assigned to process either encryption operations, decryption operations, and decryption and encryption operations, that are scheduled for processing. A maximum number of the encryption processing cores are set for processing only the decryption operations, thereby lowering a decryption latency. A minimal number of the encryption processing cores are allocated for processing the encryption operations, thereby increasing encryption latency. Upon reaching a throughput limit for the encryption operations that causes the minimal number of the plurality of encryption processing cores to reach a busy status, the minimal number of the plurality of encryption processing cores for processing the encryption operations is increased.

27 Claims, 7 Drawing Sheets

(56) References Cited

U.S. PATENT DOCUMENTS

| | | | |
|---|---|---|---|
| 2009/0249356 A1* | 10/2009 | He | G06F 9/526 |
| | | | 719/314 |
| 2009/0328055 A1* | 12/2009 | Bose | G06F 1/3203 |
| | | | 718/105 |
| 2010/0083273 A1* | 4/2010 | Sihn | G06F 9/5016 |
| | | | 718/104 |

OTHER PUBLICATIONS

Singh et al., "MorphoSys: an integrated reconfigurable system for data-parallel and computation-intensive applications" pp. 465-481, vol. 49. Issue 5, May 2000, IEEE Transactions on Computers.

* cited by examiner

REDUCING DECRYPTION LATENCY FOR ENCRYPTION PROCESSING

CROSS REFERENCE TO RELATED APPLICATIONS

This application is a Continuation of U.S. patent application Ser. No. 13/523,613, filed on Jun. 14, 2012.

BACKGROUND OF THE INVENTION

Field of the Invention

The present invention relates in general to computers, and more particularly to reducing decryption latency during encryption processing in a storage system.

Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. Many of these computer systems include virtual storage components. However, due to the various processing components and applications, the computer systems experience input/output (I/O) latencies.

SUMMARY OF THE DESCRIBED EMBODIMENTS

With increasing demand for faster, more powerful and more efficient ways to store information, optimization of storage technologies is becoming a key challenge. Encryption and decryption operations are used in order to prevent rogue users from gaining access to secure information loaded within a computing system. In order to protect the secured data, computing systems may employ some form of encryption/decryption technology in order to prevent access to sensitive information. In any computing system, the decryption and encryption latency occurring during the decryption/encryption process is critical for application performance.

Although processor speeds continually increase in response to the growing demands of data, media, and/or graphics applications, memory performance increases have not kept pace with the reduction in processor clock periods. The problems of decryption latency, or the time required to access encrypted data, in addition with the increasing bandwidth of such media and graphics applications, require innovative memory architectures if processor performance is to continue to increase. For example, storage systems introduce processing on a encryption and decryption path, which processing overhead causes latency. To minimize the encryption latency, storage arrays use a read cache that absorbs the encryption latency for all cases. As a result, performing memory encryption by is not feasible because the memory encryption in read operations would introduce additional latency beyond the current bottleneck that exists between processors and memory.

Currently, there are no techniques available to avoid the decryption latency on unpredicted, random decryption operations for processing encryption data. As a result, efficiency and productivity may be reduced. Thus, a solution is required for reducing the decryption latency on unpredicted, random decryption operations for processing encryption data in a computing system.

Accordingly, and in view of the foregoing, various exemplary method, system, and computer program product embodiments for reducing decryption latency for processing encryption data in a storage system using a pool of encryption processing cores are provided. In one embodiment, by way of example only, the encryption processing cores are assigned to process encryption operations, decryption operations, or decryption and encryption operations, which are scheduled for processing. A maximum number of the encryption processing cores are set for processing only the decryption operations, thereby lowering decryption latency. A minimal number of the encryption processing cores are allocated for processing the encryption operations, thereby increasing encryption latency. Upon reaching a throughput limit for the encryption operations that causes the minimal number of the encryption processing cores to reach a busy status, the minimal number of the encryption processing cores for processing the encryption operations is increased.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
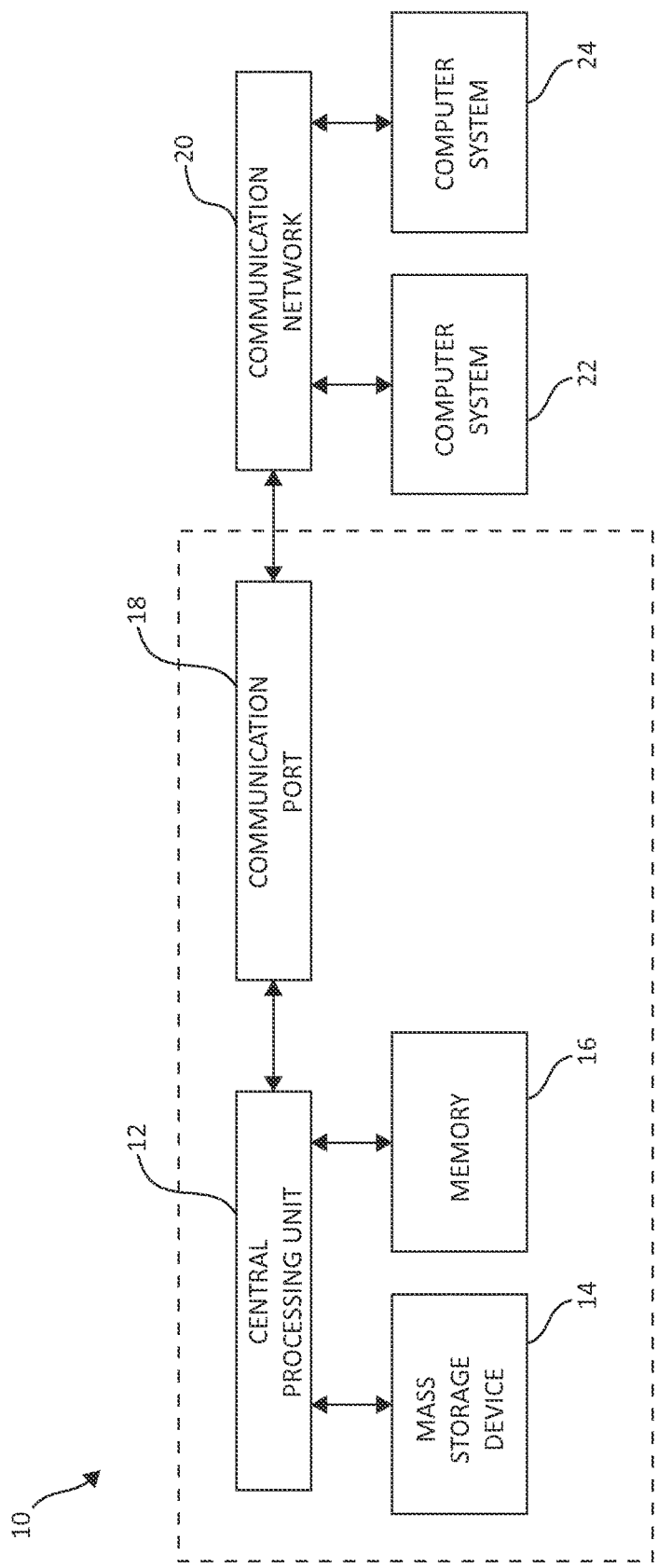
FIG. 1 is a block diagram illustrating a computing system environment having an example storage device in which aspects of the present invention may be realized.

As previously mentioned, with increasing demand for faster, more powerful and more efficient ways to store information, optimization of storage technologies is becoming a key challenge. Thus, to avoid and/or dramatically lower the encryption latency (e.g., decryption operations) on unpredicted, random decryption operations, the present invention seeks to provide a new scheduling operation for decryption and encryption operations. In one embodiment, the same pool of encryption processing cores is used for both an encryption operation and a decryption operation in the computing system. It should be noted that rather than using general CPU cores, a more specific, dedicated hardware component for handling decryption and encryption may be used, such as an encryption engine (e.g., encryption processing cores). In one embodiment, a scheduler is queuing requests (e.g., requests for a decryption and/or a encryption operation) as they arrive for processing in the pool of encryption processing cores. If the request is an encryption operation, the scheduler queues an encryption request. If the request is a decryption operation, the scheduler queues a decryption request. However, rather than scheduling the requests in a traditional way, such as using a round robin technique or by scheduling based on priority, the scheduling of the decryption and encryption requests applies a different technique for automatically minimizing the latency for decryption operations (which latency is visible to a user), while increasing the encryption latency, since the encryption cache (which hides the latency from the user) is able to absorb the increased encryption latency without a user detecting the increased encryption latency.

It should be noted that the reduction in decryption latency is not reducing the decryption latency of a single decryption request, but rather reducing the overall decryption latency of all of the decryption requests within the queue. For example, if there are 10 requests in a queue, and each single request has either a 1 millisecond latency queue or a 2 millisecond latency delay (depending on the type of request), the total, combined latency of all of the requests within the queue is either 10 milliseconds, at a minimum, or 20 milliseconds at a maximum. Also, the last request is receiving all of the previous requests latency due to the positioning and delays in the queue. When the requests are unpredicted, random requests, there is currently no method for controlling and reducing the total, combined latency of all of the requests within the queue to the smallest possible value. Because the encryption latency is greater than the decryption latency, the illustrated embodiments described herein, provide for the reduction in the decryption latency of all of the decryption requests for unpredicted, random requests, by assigning the encryption cores process either encryption operations, decryption operations, and/or decryption and encryption operations. A maximum number of the encryption cores are set for processing only the decryption operations, thereby lowering a decryption latency. A minimal number of the encryption cores are allocated for processing the encryption operations, thereby increasing encryption latency. Upon reaching a throughput limit for the encryption operations, that causes the minimal number of the plurality of encryption cores to reach a busy status, the minimal number of the plurality of encryption cores for processing the encryption operations is increased.

The scheduling may be for decryption processing in a storage system and/or encryption processing in a storage system. Since the encryption cache is effective in hiding the encryption latency from the user, while the decryption cache is inefficient for hiding the decryption latency, scheduling for the decryption operations and the encryption operations is performed so as to lower the decryption latency that is visible to the user, while increasing the encryption latency which is hidden.

The new scheduling operation schedules the encryption requests and the decryption requests by allocating to each encryption processing core, in a pool of encryption processing cores, either a decryption only request, a encryption only request, and/or a decryption and a encryption request. A maximum number of encryption processing cores are set and defaulted for processing only the decryption requests. A minimal amount of cores are allocated for processing only the encryption requests. The encryption operation bandwidth is sustained by measuring core idle times and thresholds enforcement. The threshold may be a some predetermined set of criteria to determine if a encryption core is idle or busy. For example, one set of criteria could be the throughput limit available on the encryption processing core for processing the write operations before the encryption cache can no longer sustain without detection the increased, but hidden, encryption latency. The criteria may also be changing an encryption processing core to a busy state when 100% of the encryption core's processing power has been consumed, thus anything less than 100% processing power consumption would be in an idle state. (The threshold is used to change the encryption processing cores from one state to another state, e.g., from an idle state to a busy state.) Moreover, an encryption processing core may be considered to be in the idle state when the encryption processing core has not processed a decryption/encryption request during a last, specified threshold time period. An encryption processing core may also be considered to be in the busy state when the encryption processing core has processed at least one decryption/encryption request during a last, specified threshold time period. Each of these factors may be used independent of each other or may be combined to establish the threshold for determining either a busy state or an idle state of the encryption processing cores. On fully loaded systems, where all encryption processing cores have reached a busy state, all encryption processing cores are assigned to perform both the decryption and encryption processing tasks. Moreover, when scheduling either the encryption requests and/or the decryption requests between encryption processing cores that have different processing power, a threaded weight value (TWV) is assigned to each one of the encryption processing cores. Thus the scheduler is only able to send to the encryption processing cores only a specified number of the specific type of operation, based on the TWV. In this way, the encryption processing cores are not only able to receive permission to process only a specific type of operation (e.g., receive permission to only process decryption requests), but also, the encryption processing cores proportionally process the requests according to the assigned TWV, which indicates the processing power of the encryption processing core.

To illustrate the scheduling, consider the following scenario with a pool of four (4) encryption processing cores being used for both an encryption operation (e.g., compression operation) and a decryption operation. First, rather than assigning each one of the encryption processing cores both the decryption operations and the encryption operations, the scheduler assigns the decryption only requests to the first three encryption processing cores for processing, and assigns the encryption only requests to a single encryption processing core (in this case the right most encryption processing core). Inherently, the encryption operations consume a significantly greater amount of processing time as compared to decryption operations, which consume a lesser amount of processing time. Thus, by restricting all of the encryption operations to a minimal amount (which may be only one) of encryption processing cores (e.g., the rightmost encryption processing core), and allowing all other encryption processing cores (a maximum amount) to process only the decryption operations (e.g., the encryption operations), the encryption latency of the encryption operations is increased only on the minimal amount of encryption processing cores because there is a larger queue of encryption operations, while reducing the latency on the decryption operations in the all other encryption processing cores. In other words, because there is no mix of decryption operations and encryption operations to the encryption processing cores, the scheduling queue for the decryption operations is decreased thereby lowering the decryption latency, but the scheduling queue for the encryption operations is increased thereby increasing the encryption latency. However, since the encryption operations utilize an encryption cache, the increase latency is absorbed in the encryption cache and remains hidden from the user until the encryption cache can no longer sustain without detection the increased, but hidden, encryption latency. The encryption operation bandwidth is sustained by measuring core idle times and the threshold enforcement available on the encryption-processing core for processing the encryption operations.

In the event that throughput of the encryption operations has increased to such a degree that the singular encryption processing core (e.g., the rightmost encryption processing core) changes to a busy status (e.g., goes to one hundred percent utilization), and is no longer capable of handling the throughput of all of the encryption operations, an additional encryption processing core may be allocated to handle the encryption only tasks. Thus, by now having two encryption processing cores processing the encryption only operations, the throughput of the encryption operations is maintained. Again, because the encryption cache hides the latency of the encryption operations, the only concern relating to the encryption operations is maintaining the throughput of the encryption operations. If the throughout becomes significantly large, the encryption cache may reach a point where the encryption latency is no longer absorbed by the encryption cache. By maintaining the throughput, despite the increased latency of the encryption operations, the encryption cache continually absorbs all of the encryption latency of the encryption operations, thereby allowing the latency of the encryption operations to remain irrelevant and hidden to the user. The encryption cache may be compared to springs on a vehicle and the throughput compared to the height of a bump in the road. If the height of the bump (throughput) in the road is low the springs (encryption cache) will absorb all, if not most, of disturbance (encryption latency). If the height of the bump (throughput) in the road is high the springs (encryption cache) may not absorb the entire disturbance (encryption latency) created by a bump and a person will feel the disturbance (encryption latency).

The remaining two encryption-processing cores continue to process the decryption only operations. The other the encryption processing cores only process the encryption only operations. Again, by restricting all encryption operations to two specific encryption processing cores (e.g., the two rightmost encryption processing cores) and allocating the other two encryption processing cores to process only the decryption operations, the latency of the encryption operations is still increased because there remains a larger queue of encryption operations. However, the decryption latency on the decryption operations in the two other encryption processing cores is still reduced. The restriction of not mixing the decryption and encryption operations to any of the encryption processing cores is maintained.

The process of adding an additional encryption processing core for processing the encryption only tasks may continue for an nth number of times, depending on how many encryption processing cores are in the pool of resources and if the throughput of the encryption operations has increased to such a degree that both of the two encryption processing cores (e.g., the rightmost encryption processing core) go to one hundred percent utilization, and both are no longer capable of handling the throughput of all of the encryption operations. If the situations arises where all encryption processing cores are fully loaded (e.g., all encryption processing cores are in the busy state) and/or at one hundred percent utilization, the scheduler may now mix the decryption and encryption operations and assign both decryption and encryption operations to each one of the encryption processing cores. It should be noted the illustrated embodiments described herein, may be applied and used in the encryption operations performing any encryption of data that is being encrypted to a disk/storage system and/or or any decryption/manipulation to data that is being decrypted from a disk/storage system, and this manipulation is requiring processing power.

Turning now to FIG. 1, exemplary architecture 10 of data storage systems (e.g., virtual tape systems) in a computing environment is depicted. The computer system 10 includes central processing unit (CPU) 12, which is connected to mass storage device(s) 14 and memory device 16. Mass storage devices can include hard disk drive (HDD) devices, solid-state devices (SSD) etc, which can be configured in a redundant array of independent disks (RAID). The backup operations further described can be executed on device(s) 14, located in system 10 or elsewhere. Memory device 16 can include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24.

Figure 2:
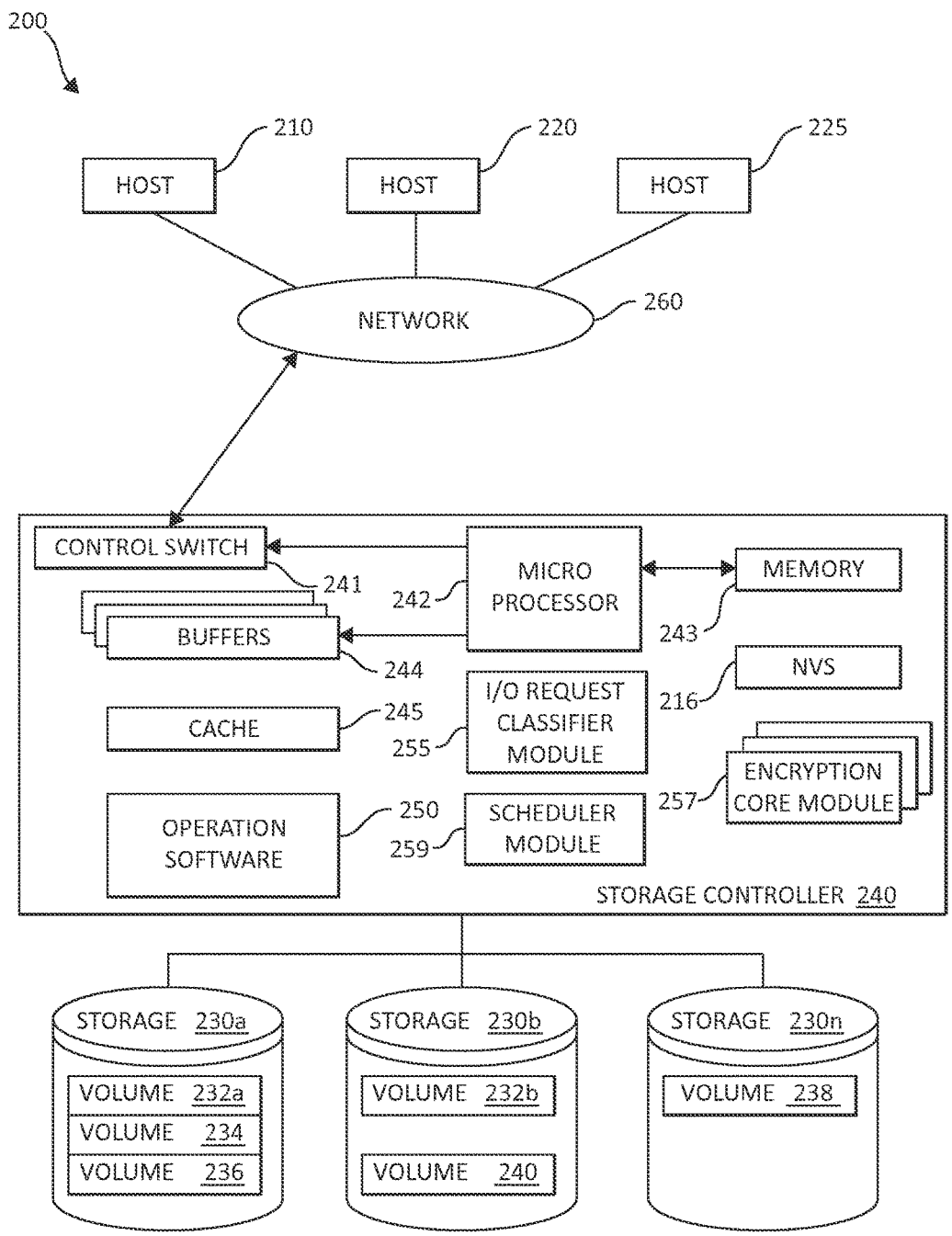
FIG. 2 is a block diagram illustrating a hardware structure of an exemplary data storage system in a computer system in which aspects of the present invention may be realized.

FIG. 2 is an exemplary block diagram 200 showing a hardware structure of a data storage system in a computer system according to the present invention. Referring to FIG. 2, there are shown host computers 210, 220, 225, each acting as a central processing unit for performing data processing a part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 1 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of encryption and decryption requests intended for storage 230. The system memory 243 of storage controller 240 stores program instructions and data, which the processor 242 may access for executing functions and method steps associated with managing storage 230 and executing the steps and methods of the present invention in a computing environment. In one embodiment, system memory 243 includes, is associated, or is in communication with the operation software 250 in a computer storage environment, including the methods and operations described herein. As shown in FIG. 2, system memory 243 may also include or be in communication with a cache 245 for storage 230, also referred to herein as a "cache memory", for buffering "encryption data" and "decryption data", which respectively refer to encryption/decryption requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the Cache 245 for any purposes suited to accomplish the objectives of the present invention. In some embodiments, a backup power source (not shown in FIG. 2), such a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a encryption/decryption request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a I/O request classifier module 255, a encryption processing core(s) module 257, and a scheduler module 259 in a computing environment. The I/O request classifier module 255, encryption processing core(s) module 257, and the scheduler module 259 may work in conjunction with each and every component of the storage controller 240, the hosts 210, 220, 225, and storage devices 230. The I/O request classifier module 255, encryption processing core(s) module 257, and the scheduler module 259 may be structurally one complete module or may be associated and/or included with other individual modules. The I/O request classifier module 255, encryption processing core(s) module 257, and the scheduler module 259 may also be located in the cache 245 or other components of the storage controller 240 to accomplish the purposes of the present invention.

The storage controller 240 may be constructed with a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to decryption and encryption data, a control switch 241 for controlling a protocol to control data transfer to or from the storage devices 230, the I/O request classifier module 255, encryption processing core(s) module 257, and the scheduler module 259 on which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network adaptor (this could be a fibre channel) 260 as an interface i.e., via at least one switch called "fabric." In one embodiment, by way of example only, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, the I/O request classifier module 255, encryption processing core(s) module 257, and the scheduler module 259 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

As previously mentioned, in one embodiment, by way of example only, the encryption processing cores are assigned to process either encryption operations, decryption operations, or decryption and encryption operations, which are scheduled for processing. A maximum number of the encryption processing cores are set for processing only the decryption operations, thereby lowering a decryption latency. A minimal number of the encryption processing cores are allocated for processing the encryption operations, thereby increasing encryption latency. Upon reaching a throughput limit for the encryption operations that causes the minimal number of the plurality of encryption processing cores to reach a busy status, the minimal number of the plurality of encryption processing cores for processing the encryption operations is increased.

In this way, the decryption latency is reduced in a processing storage system with a encryption cache, using a pool of processor cores used for both decryption and encryption operations. The decryption requests and the encryptions requests are scheduled for lowering the decryption latency, which is visible to the user, while increasing the encryption latency that is hidden using the encryption cache. As will be illustrated below in FIG. 3, the illustrated embodiments first define a state of the encryption processing cores. The encryption processing cores may be either defined to be in an idle state or a busy state. An encryption processing core is considered to be in the idle state when the encryption processing core has not processed any decryption and/or encryption request during a last, specified threshold time period. As mentioned previous, an encryption processing core may considered to be in the busy state when the encryption processing core has processed any decryption and/or encryption request during a last, specified threshold time period.

For encryption processing cores with different processing power, a thread weight value (TWV) may be assigned. The TWV determines what proportion of the workload the encryption processing core will bear relative to other encryption processing cores. For example, if one encryption processing core has TWV weight of 30 and all other threads have TWV weight of 60, the 30-weight thread will bear half as much as any other thread that has the 60-weight thread.

Each I/O request will be assigned to one encryption processing core from a pool of encryption processing cores. These encryption requests and decryption requests that are to be sent to the encryption processing cores are classified as either a decryption operation or a encryption operation. Since the encryption processing cores are given a status of either idle or busy, the encryption processing cores are granted permission to handle the decryption operations and/or encryption operations, depending on the determined status (idle or busy). The decryption and encryption operations are further classified as one of at least three concrete types of operations: decryption only operation (D), encryption only operation (E) and/or decryption and encryption operation (D/E).

The default assignment of the I/O requests/tasks is to set a maximum number of encryption processing cores for the decryption operations and to allot only a minimum number of encryption processing cores for the encryption operations. To sustain the encryption operations bandwidth, the encryption processing core idle time and threshold enforcement (e.g., a determination as to whether the encryption processing cores are in an idle or busy state) is measured and determined. Additional encryption processing cores for the encryption request may be added to the minimum number of encryption processing cores for the encryption operations as needed. On a fully loaded system all cores may be assigned to decryption and encryption operations.

For example, consider a system with pool of four encryption processing cores (encryption processing cores #1, #2, #3, and #4) and the processing power of encryption processing core #1 is half as compared with all the other encryption processing cores. The default assignment (when all encryption processing cores are IDLE) is to assign the maximum number of encryption processing cores to the decryption operations and minimal number of encryption processing cores to the encryption operations. Since encryption processing core #1 has half as much processing powers as all other encryption processing cores, the number of I/O requests scheduled for encryption processing core #1 to process will be less. The scheduled number of decryption requests for encryption processing core #1 will be assigned according to the TWV. When the encryption operations' encryption request bandwidth is increasing, the encryption processing core #4 will become busy at the point of reaching the TWV. At this point, an additional core, which would be encryption processing cores #3, since it is the encryption processing cores that is adjacent to encryption processing core #4, is assigned to perform the encryption requests. Again, because encryption processing core #1 has half as much processing powers as all other cores, the number of decryption requests scheduled for encryption processing core #1 to process will be less. The scheduled number of encryption requests for encryption processing core #1 will be assigned according to the TWV. When the encryption operations' bandwidth for core #3 is increasing, the encryption processing core #3 will become busy at the point of reaching the TWV. At this point, an additional encryption processing core, which would be encryption processing cores #2, since it is the encryption processing core that is adjacent to encryption processing core #3, is assigned to perform the encryption requests. Again, because encryption processing core #1 has half as much processing powers as all other cores, the number of decryption requests scheduled for encryption processing core #1 to process will be less. The scheduled number of decryption requests for encryption processing core #1 will be assigned according to the TWV. In a fully loaded system (e.g., all the encryption processing cores are busy), all encryption processing cores are assigned to process the decryption and encryption I/O requests. Similar to the previous stated scenarios, even when all cores are busy, encryption processing core #1 has half as much processing powers as all other cores, the number of decryption requests scheduled for encryption processing core #1 to process will be less. The scheduled number of decryption requests for encryption processing core #1 will be assigned according to the TWV.

Figure 3:
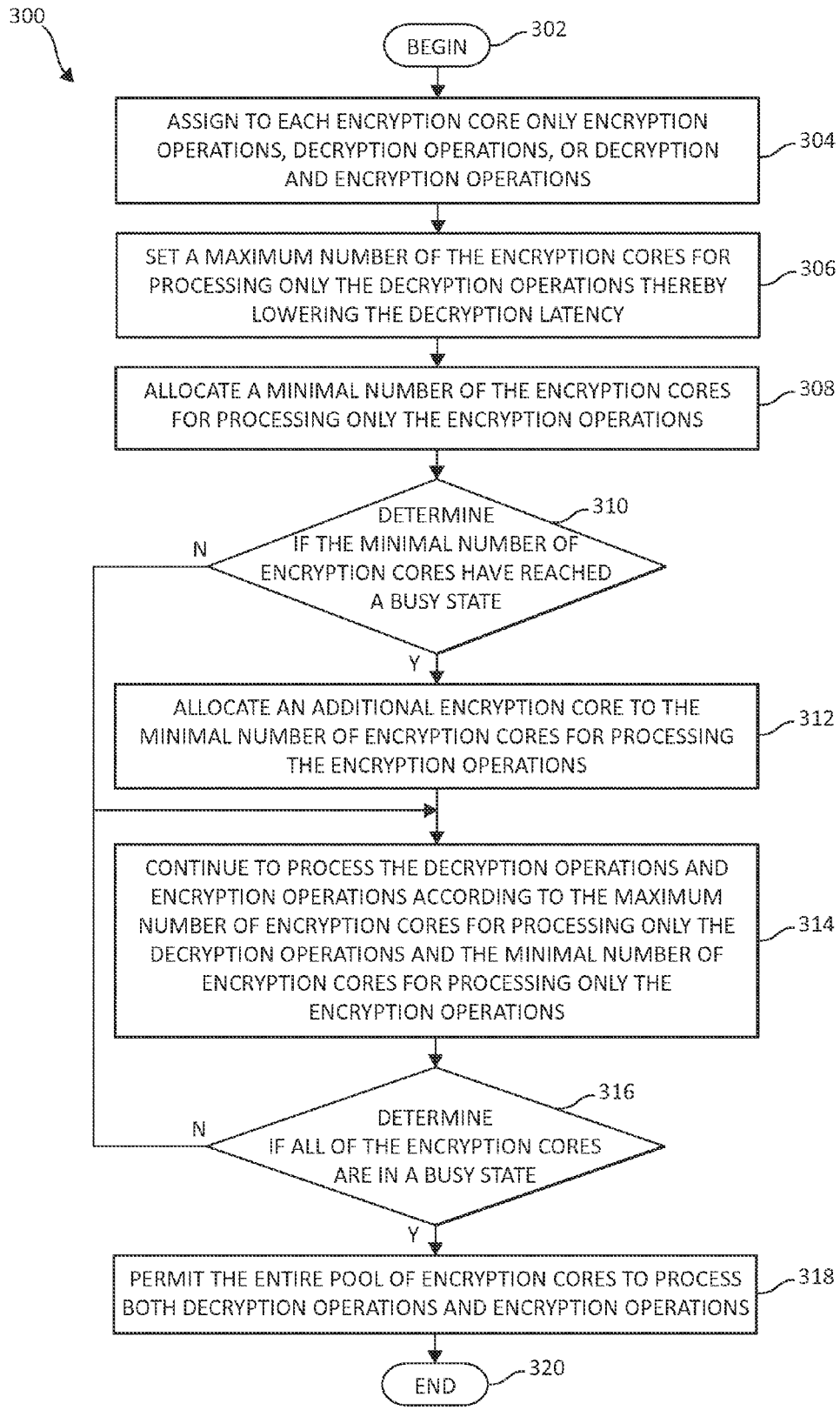
FIG. 3 is a flowchart illustrating an exemplary method for reducing decryption latency in a computing system.

Turning now to FIG. 3, a flowchart illustrating an exemplary method 300 for reducing decryption latency in a storage system is depicted. The method 300 begins (step 302) by assigning to each encryption processing core only encryption operations, decryption operations, or decryption and encryption operations (step 304). A threaded weight value (TWV) may be set/assigned for the encryption cores having different processing power (e.g., the encryption cores with different processing power are assigned the TWV weight value) to assist with allocating the decryption operations and the encryption operations, for which the encryption cores have been granted access to perform, to proportionately process the decryption operations and the encryption operations according to the TWV. A maximum number of the encryption cores are set for processing only the decryption operations, thereby lowering the decryption latency (step 306). A minimal number of the encryption cores are allocated for processing only the encryption operations, thereby increasing the encryption latency (step 308). This minimal number of the encryption cores may be just one core that is allocated for processing the encryption operations. The method 300 determines if the minimal number of encryption cores have reached a busy status (step 310). If yes, the method 300 may allocate an additional encryption core to the minimal number of encryption cores for processing the encryption operations (step 312). If no, the method 300 continues to process the decryption operations and encryption operations according to steps 306 and 308 (step 314). The method 300 also determines if all of the encryption cores are in a busy status (step 316). In other words, if there is only one remaining core in the "maximum set number of encryption cores" for processing the decryption only operations has achieved 100% utilization or reached the TWV threshold, then this last remaining encryption core will become busy. If all of the encryption cores are in a busy status/state, the method 300 permits the entire pool of processing cores to process both decryption operations and encryptions operations (step 318). If all of the encryption cores are not in a busy status, the method 300 continues to process the decryption operations and encryption operations according to steps 306 and 308. The method ends (step 320). It should be noted that a time out period may and set for determining if the encryption cores are in an idle state or a busy state.

As mentioned previously, the decryption and encryption operations are further classified as one of at least three concrete types of operations: decryption only operation (D), encryption only operation (E) and/or decryption and encryption operation (D/E). The permissions for the decryption only operation (D), the encryption only operation (E) and/or the decryption and encryption operation (D/E) are granted to each encryption processing core and illustrated below in FIG. 4-7.

Figure 4:
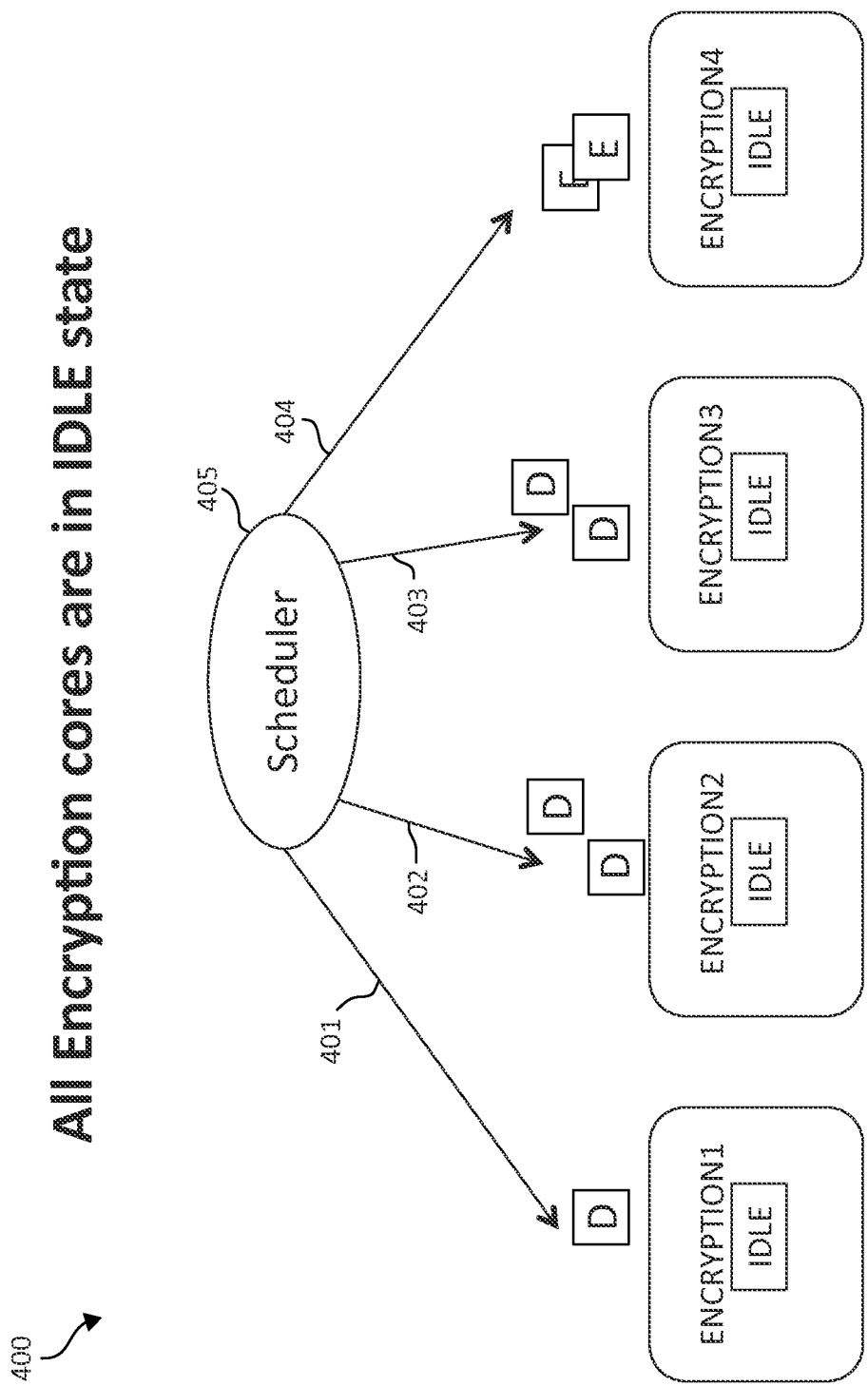
FIG. 4 is a block diagram illustrating exemplary operations for reducing decryption latency where all encryption processing cores are in an idle state.

FIG. 4 is a block diagram 400 illustrating exemplary operations for reducing decryption latency where all encryption processing cores are in an idle state. When all encryption processing cores (labeled as encryption processing core1, encryption processing core 2, encryption processing core 3, and encryption processing core 4) are determined to be in an idle state, all encryption processing cores, except the last encryption processing core 4 (counted from left to right), will be assigned/permitted to processes only decryption operations (D) (labeled in FIGS. 4-7 as "D"). The encryption processing core (e.g., encryption core 4) will be permitted to process only encryption operations (E) (labeled in FIGS. 4-7 as "E"). In this scenario, each of the encryption processing cores (e.g., encryption processing cores 1-3), expect for the last encryption-processing core (e.g., encryption processing core 4), are assigned/granted permission 401, 402, and 403 to process only decryption operations (D). Thus, three encryption processing cores 1-3 are determined to be the maximum number of cores to process the decryption operations (D) and the minimum number of encryption processing cores for processing the encryption operations (E) is determined to be one. For setting and determining the maximum number of compress cores for processing the decryption operations (D), in one embodiment, the encryption processing cores are counted, starting from a firstmost position (e.g., a left most position) and continuing the counting until just previous to a lastmost position (e.g., stop counting just previous to the rightmost positioned encryption processing core). In other words, all encryption processing cores, starting from the left and counting to the right, and stopping just short of the last, right most positioned core, may be determined to be set as the maximum number of the encryption processing cores for being assigned the decryption operations (D). The lastmost (e.g., the rightmost positioned core) is then considered to be the minimum number of cores for being assigned the encryption operations (E).

Thus, the scheduler 405 assigns/sends 401, 402, and 403 each encryption processing core (e.g., encryption processing core 1-3), expect for the last encryption processing core (e.g., encryption processing core 4), the decryption only operations (D). The last encryption processing core (e.g., encryption processing core 4) is assigned/granted permission 404 to process encryption only operations (E). More specifically, the scheduler sends to the last encryption processing core (e.g., encryption processing core 4) only the encryption only operations (E).

Moreover, if each encryption processing core is assigned a thread weight value (TWV), and the TWV determines what proportion of the workload the encryption processing core will bear relative to other encryption processing cores, each encryption processing core will proportionally process the decryption operations and the encryption operations. In this scenario 400, by way of example only, encryption processing core 1 is assigned a lowest TWV, and encryption processing cores 2-4 are assigned a different TWV. Thus, based upon the TWV assigned to encryption processing core 1, the scheduler 405 assigns/sends 401 only 1 decryption only operations (D) to encryption processing core 1. Also, based on the TWV assigned to each of the remaining cores (encryption processing cores 2-4), the scheduler 405 assigns/sends 402 and 403 to encryption processing core 2 and encryption processing core 2 two decryption operations (D), and the scheduler 405 assigns/sends 404 to encryption processing core 4 two encryption operations (E).

As a general rule, when a encryption processing core from the lastmost side (e.g., the rightmost side) is determined to be in the busy state, and all other encryption processing cores to the left side of this lastmost encryption processing core (e.g., rightmost encryption processing core) are determined to be in the idle state, at least one additional encryption processing core from this lastmost side (e.g., right side) is granted permission for processing encryption operations. In other words, each time a encryption processing core from the right side has reached a busy status, and all other encryption processing cores from left side are in idle state, permission is granted for an additional encryption processing cores to be granted permissions to process the encryption only requests. (This additional encryption processing core, which was determined to be in the idle state, may now receive permission for the encryption operations. This additional encryption processing core is to the immediate left of the right most compression unit that was determined to be in the busy mode. This process, as mentioned previously and illustrated below in FIGS. 5-6, assists in determining and setting the maximum number of cores for assigning the decryption operations and the minimal number of cores for the encryption operations.

Figure 5:
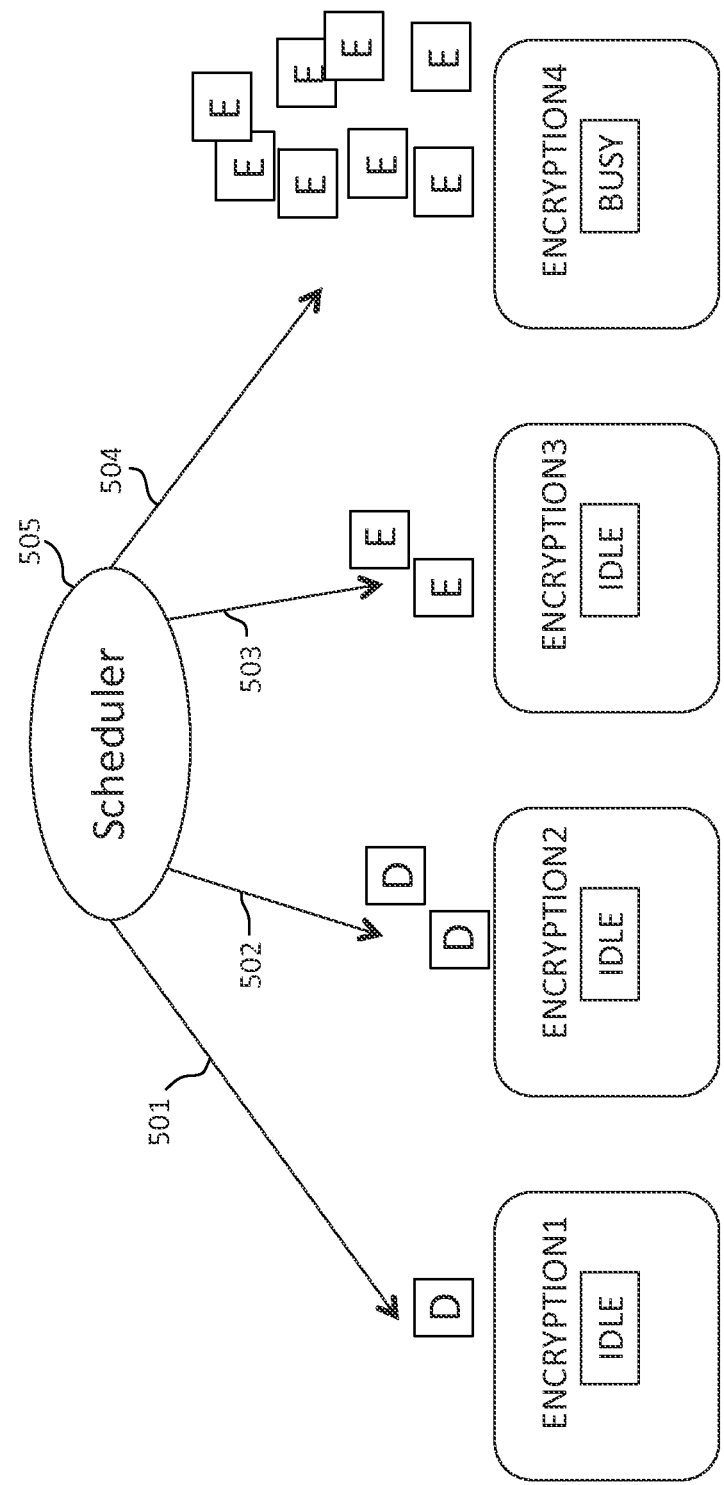
FIG. 5 is a block diagram illustrating exemplary operations for reducing decryption latency where all encryption processing cores are in an idle state except for a rightmost encryption processing core.

FIG. 5 is a block diagram 500 illustrating exemplary operations for reducing decryption latency where all encryption processing cores are in an idle state except for a rightmost encryption processing core. In this scenario all encryption processing cores 1-3 are determined to be in an idle state except for a rightmost encryption processing core 4, which is determined to be in the busy state. Thus, by applying the general rule, as mentioned above the first two threads (e.g., encryption processing cores 1 and 2) will be permitted to process only the decryption only operations (D). More specifically, the scheduler 505 assigns/sends 501 and 502 to encryption processing cores 1 and 2 only the decryption only operations (D).

Since the lastmost encryption processing core 4 is determined to be in a busy status, and all other encryption processing cores 1-3, that were to the left side of this lastmost encryption processing core 4 are in an idle status, an additional encryption processing core (e.g., encryption processing core 3), that is just left of this lastmost side (e.g., encryption processing core 3 is just left of encryption processing core 4), is now assigned/granted 503 permission for processing encryption operations (E). More specifically, the scheduler 505 sends 503 to this additional encryption processing core (e.g., encryption processing core 3) that is just left of this lastmost side of encryption processing cores (e.g., encryption processing core 4), only the encryption only operations (E).

As stated above, if each core is assigned a thread weight value (TWV), and the TWV determines what proportion of the work-load the encryption processing core will bear relative to other encryption processing cores, each encryption processing core will proportionally process the decryption operations and the encryption operations. In this scenario 500, by way of example only, encryption processing core 1 is assigned a lowest TWV, and encryption processing cores 2-4 are assigned a different TWV. Thus, based upon the TWV assigned to encryption processing core 1, the scheduler 505 assigns/sends 501 only 1 decryption only operations (D) to encryption processing core 1. Also, based on the TWV assigned to encryption processing cores 2-4, the scheduler 505 assigns/sends 503 two decryption only operations (D) to encryption processing core 2. However, encryption processing core 4 is in a busy status, when processing 8 encryption only operations (E) because the encryption operations' bandwidth was increasing for each additional encryption only operation (E). At this point, encryption processing core 4 had a busy status, due to the throughput limit reaching a maximum allowable point before the encryption cache could no longer sustain, without detection, the increased, but hidden, encryption latency. Because of the busy status, an additional core, which would be encryption processing core 3 since it is the encryption processing core that is adjacent to encryption processing core 4, is assigned 503 to process only the encryption I/O requests (E). Thus, the scheduler 505 sends 503 two encryption only operations (E) to encryption processing core 3.

Figure 6:
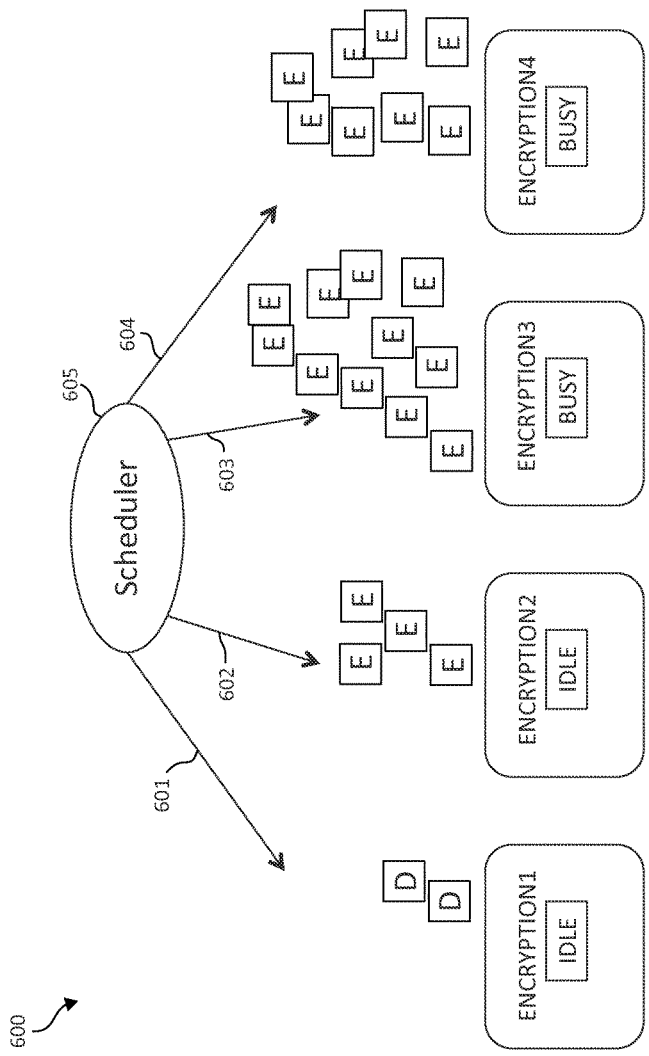
FIG. 6 is a block diagram illustrating exemplary operations for reducing decryption latency where all encryption processing cores are in an idle state except for the 2 rightmost encryption processing cores.

FIG. 6 is a block diagram 600 illustrating exemplary operations for reducing decryption latency where all encryption processing cores are in an idle state except for the 2 rightmost encryption processing cores. In this scenario encryption processing cores 1-2 are determined to be in an idle state. The two-lastmost/rightmost encryption processing cores 3-4 are determined to be in the busy state. Thus, by applying the general rule, as mentioned above, only the first encryption processing core 1 will be assigned/permitted 601 to process only the decryption only operations (D). More specifically, the scheduler 605 only sends 601 to the first encryption processing cores (e.g., encryption processing core 1) the decryption only operations (D).

Since the two, lastmost encryption processing cores 3-4 were determined to be busy, an additional encryption processing core (e.g., encryption processing core 2) that is just left of the first one of the lastmost encryption processing cores (e.g., encryption processing core 3) is now assigned/granted 602 permission for processing encryption only operations (E). More specifically, the scheduler sends to this additional encryption processing core (e.g., encryption processing core 2) that is just left of the first one of the lastmost side of encryption processing cores (e.g., encryption processing core 3), only encryption operations (E), even though this additional encryption processing core (e.g., encryption processing core 2) was determined to be in the idle state. The scheduler 605 sends 603 and 604 to these two lastmost-encryption processing cores (e.g., encryption processing cores 3 and 4) only the encryption only operations (E).

Similar to FIG. 5 and FIG. 6, if each encryption processing core has a different processing power, a thread weight value (TWV) is assigned, and the TWV determines what proportion of the work-load the encryption processing core will bear relative to other encryption processing cores. Each encryption processing core will proportionally process the decryption operations and the encryption operations, according to the TWV. In this scenario 500, by way of example only, encryption processing core 1 is assigned a lowest TWV, and encryption processing cores 2-4 are assigned a different TWV. Thus, based upon the TWV assigned to encryption processing core 1, the scheduler 605 assigns/sends 601 two decryption only operations (D) to encryption processing core 1. The scheduler 605 sends 602 three encryption only operations (E) to encryption processing core 2. As illustrated, encryption processing core 3 sends 603 ten encryption only operations (E). Encryption core 4 sends 604 eight encryption only operations (E). This was because the encryption operations' bandwidth was increasing for encryption processing cores 3 and 4 and both encryption processing cores 3-4 reached a busy status, and thus, reached a threshold limit, where the encryption cache could no longer sustain without detection, the increased, but hidden, encryption latency. Thus encryption processing core 3 was allocated to the minimal number of encryption processing cores for handing the additional encryption only operations (E). Thus, the scheduler 605 sends 603 three encryption only operations (E) to encryption processing core 2. Compression cores 3 and 4 continue to process the assigned/sent 603 and 604 encryption only operations (E).

However, when all encryption processing cores 1-4 are determined to be in an busy state, each one of the encryption processing cores are granted permission to process (e.g., handle) both decryption operations and encryption operations. This scenario is depicted in FIG. 7 below.

Figure 7:
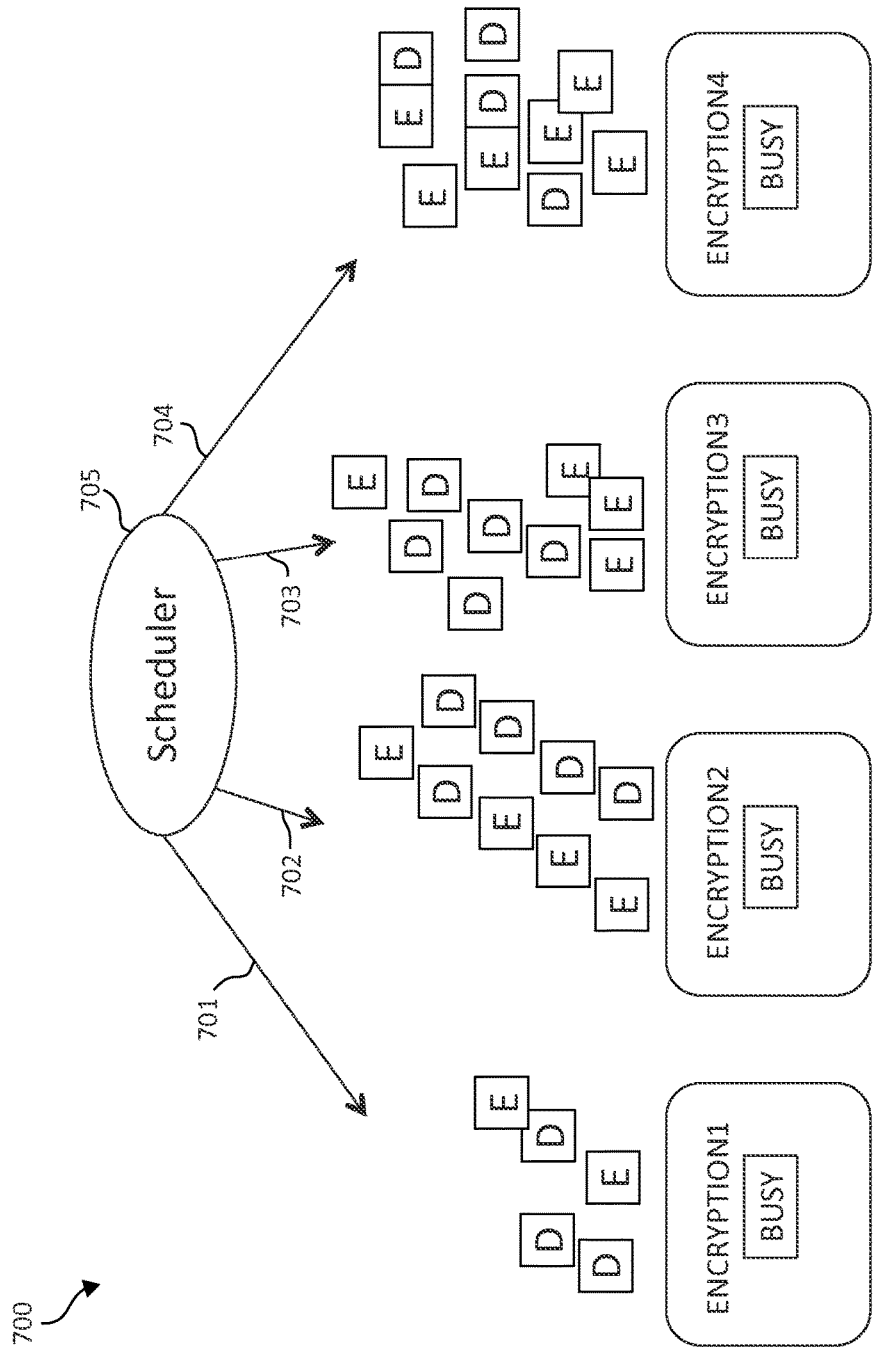
FIG. 7 is a block diagram illustrating exemplary operations for reducing decryption latency where all encryption-processing cores are in the busy state.

FIG. 7 is a block diagram 700 illustrating exemplary operations for reducing decryption (I/O) latency where all encryption processing cores are in the busy state. When all encryption processing cores 1-4 are determined to be in the busy state, all threads (e.g., all encryption processing cores 1-4) will be assigned/permitted 701, 702, 703, and 704 to handle both decryption operations and encryption operations (labeled in the diagram as "D" and "E" rather than as described above that indicated a "decryption and encryption operation (D/E)"). In this scenario, each of the encryption processing cores 1-4 is assigned/permitted 701, 702, 703, and 704 (e.g., granted permission) to process the decryption operations (D) and the encryption operations (E). More specifically, the scheduler 705 assigns/sends 701, 702, 703, and 704 to each encryption processing core 1-4 both the decryption only operations (D) and the encryption only operations (E).

In the fully loaded system (e.g., all the core are busy), all encryption processing cores are assigned to process the decryption and encryption I/O requests. Similar to the previous stated scenarios, even with all of the encryption processing cores reaching a busy status, encryption processing core #1 has half as much processing powers as all other cores. The number of decryption requests scheduled for encryption processing core #1 to process will be less because of the difference in processing power. The scheduled number of decryption operation for encryption processing core 1 will be assigned according to the TWV. Similar to FIG. 5-7, if the encryption processing cores 1-4 have different processing powers, each encryption processing core is assigned a thread weight value (TWV). The TWV determines what proportion of the workload each of the encryption processing cores 1-4 will bear relative to other encryption processing cores. In other words, based upon the TWV, each encryption processing core 1-4 may proportionally process the decryption operations (D) and the encryption operations (E) according to the TWV that is reflective of the processing power of the core. In this scenario 700, encryption processing core 1 is assigned a lowest TWV, and encryption processing core 2, encryption processing core 3, and encryption processing core 4 are assigned a TWV that is different than encryption processing core 1. Thus, based upon the TWV assigned to encryption processing core 1, the scheduler 705 only assigns/sends 701 three decryption only operations (D) and two encryption only operations (E) to encryption processing core 1. The scheduler 705 sends 702 five decryption only operations (D) and four encryption only operations (E) (9 total classified tasks) to encryption processing core 2. The scheduler 705 assigns/sends 703 five decryption only operations (D) and four encryption only operations (E) (9 total classified tasks) to encryption processing core 3 and four decryption only operations (D) and six encryption only operations (E) (10 total classified tasks) to encryption processing core 4.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for reducing decryption latency during encryption processing in a storage system using a pool of a plurality of encryption processing cores, comprising:
    assigning to each one of the plurality of encryption processing cores for the processing only one of encryption operations, decryption operations, and decryption and encryption operations that are scheduled for processing;
    setting a maximum number of the plurality of encryption processing cores for processing only the decryption operations, thereby lowering the decryption latency;
    assigning the decryption and encryption operations to each of the plurality of processing cores for processing if each of the plurality of encryption processing cores have attained the busy status;
    classifying the decryption and encryption operations as one of at least three types of operations represented as encryption only operations (E), the decryption only operations (D), and decryption and encryption operations (D/E);
    scheduling the encryption operations, the decryption operations, and the decryption and encryption operations, between the pool of the plurality of encryption processing cores according to a thread weight value (TWV) that is assigned to each one of the plurality of encryption processing cores having a difference in processing power;
    allocating a minimal number of the plurality of encryption processing cores for processing the encryption operations, thereby increasing encryption latency, wherein upon reaching a throughput limit for the encryption operations that causes the minimal number of the plurality of encryption processing cores to reach a busy status, the minimal number of the plurality of encryption processing cores for processing the encryption operations is increased; and
    setting a time-out period for a predetermined threshold period for processing the encryption operations, the decryption operations, and the decryption and encryption operations.

2. The method of claim 1, further including sustaining a bandwidth of the encryption operations by measuring core idle time and a throughput limit.

3. The method of claim 1, wherein the busy status represents those of the plurality of encryption processing cores that have processed at least one of the encryption operations, the decryption operations, and the decryption and encryption operations during the predetermined threshold period.

4. The method of claim 1, further including assigning only the decryption operations to the plurality of encryption processing cores having an idle status, wherein the idle status represents those of the plurality of encryption processing cores that have yet to process any of the encryption operations, the decryption operations, and the decryption and encryption operations during Hail the predetermined threshold period.

5. The method of claim 4, further including determining whether each one of the plurality of encryption processing cores had one of the idle status and the busy status during a last-predetermined threshold period.

6. The method of claim 1, further including determining the maximum number of the plurality of encryption processing cores by counting, from a firstmost positioned, one of the plurality of encryption processing cores, and sequentially counting, until reaching a lastmost positioned one of the plurality of encryption processing cores, to include in the maximum number of the plurality of encryption processing cores to process the decryption operations.

7. The method of claim 6, further including determining the minimum number of the plurality of encryption processing cores by locating the lastmost positioned one of the plurality of encryption processing cores to process the encryption operations.

8. The method of claim 7, further including:
    if the lastmost positioned one of the plurality of encryption processing cores is determined to be in the busy status, and those of the plurality of encryption processing cores to the left of the lastmost positioned one of the plurality of encryption processing cores are in the idle status:
        permitting one of the plurality of encryption processing cores that is to the immediate left of the lastmost positioned one of the plurality of compression to process the encryption operations.

9. The method of claim 8, further including:
    if at least one or more of an nth number of lastmost positioned ones of the plurality of encryption processing cores are determined to be in the busy status, and all other of the plurality of encryption processing cores to the left of the at least one or more of the nth number of lastmost positioned ones of the plurality of encryption processing cores are in the idle status:
        permitting an additional one of the at least one or more of the nth number of lastmost positioned ones of the plurality of encryption processing cores to process the encryption operations.

10. A system for reducing decryption latency during encryption processing in a storage system using a pool of a plurality of encryption processing cores, comprising:
    at least one scheduler scheduling encryption operations, decryption operations, and decryption and encryption operations between the pool of the plurality of processing cores,
    at least one encryption cache, remotely connected to each of the plurality of encryption processing cores, assisting with the encryption operations;

at least one processor device, controlling the at least one scheduler and the at least one encryption cache, and operable in the compression processing storage system, wherein the at least one processor device:
- assigns to each one of the plurality of encryption processing cores for the processing only one of encryption operations, decryption operations, and decryption and encryption operations that are scheduled for processing;
- sets a maximum number of the plurality of encryption processing cores for processing only the decryption operations, thereby lowering the decryption latency;
- assigns the decryption and encryption operations to each of the plurality of processing cores for processing if each of the plurality of encryption processing cores have attained the busy status;
- classifies the decryption and encryption operations as one of at least three types of operations represented as encryption only operations (E), the decryption only operations (D), and decryption and encryption operations (D/E);
- schedules the encryption operations, the decryption operations, and the decryption and encryption operations, between the pool of the plurality of encryption processing cores according to a thread weight value (TWV) that is assigned to each one of the plurality of encryption processing cores having a difference in processing power;
- allocates a minimal number of the plurality of encryption processing cores for processing the encryption operations, thereby increasing encryption latency, wherein upon reaching a throughput limit for the encryption operations that causes the minimal number of the plurality of encryption processing cores to reach a busy status, the minimal number of the plurality of encryption processing cores for processing the encryption operations is increased; and
- sets a time-out period for a predetermined threshold period for processing the encryption operations, the decryption operations, and the decryption and encryption operations.

11. The system of claim 10, wherein the at least one processor device sustains a bandwidth of the encryption operations by measuring core idle time and a throughput limit.

12. The system of claim 10, wherein the busy status represents those of the plurality of encryption processing cores that have processed at least one of the encryption operations, the decryption operations, and the decryption and encryption operations during flail the predetermined threshold period.

13. The system of claim 10, wherein the at least one processor device assigns only the decryption operations to the plurality of encryption processing cores having an idle status, wherein the idle status represents those of the plurality of encryption processing cores that have yet to process any of the encryption operations, the decryption operations, and the decryption and encryption operations during Hail the predetermined threshold period.

14. The system of claim 13, wherein the at least one processor device determines whether each one of the plurality of encryption processing cores had one of the idle status and the busy status during a last-predetermined threshold period.

15. The system of claim 10, wherein the at least one processor device determines the maximum number of the plurality of encryption processing cores by counting, from a firstmost positioned, one of the plurality of encryption processing cores, and sequentially counting, until reaching a lastmost positioned one of the plurality of encryption processing cores, to include in the maximum number of the plurality of encryption processing cores to process the decryption operations.

16. The system of claim 15, wherein the at least one processor device determines the minimum number of the plurality of encryption processing cores by locating the lastmost positioned one of the plurality of encryption processing cores to process the encryption operations.

17. The system of claim 16, wherein the at least one processor device:
- if the lastmost positioned one of the plurality of encryption processing cores is determined to be in the busy status and those of the plurality of encryption processing cores to the left of the lastmost positioned one of the plurality of encryption processing cores are in the idle status:
  - permits one of the plurality of encryption processing cores that is to the immediate left of the lastmost positioned one of the plurality of compression to process the encryption operations.

18. The system of claim 17, wherein the at least one processor device:
- if at least one or more of an nth number of lastmost positioned ones of the plurality of encryption processing cores are determined to be in the busy status, and all other of the plurality of encryption processing cores to the left of the at least one or more of the nth number of lastmost positioned ones of the plurality of encryption processing cores are in the idle status:
  - permits an additional one of the at least one or more of the nth number of lastmost positioned ones of the plurality of encryption processing cores to process the encryption operations.

19. A computer program product for reducing decryption latency during encryption processing in a storage system using a pool of a plurality of encryption processing cores, the computer program product comprising a non-transitory computer-readable storage medium having computer-readable program code portions stored therein, the computer-readable program code portions comprising:
- a first executable portion that assigns to each one of the plurality of encryption processing cores for the processing only one of encryption operations, decryption operations, and decryption and encryption operations that are scheduled for processing;
- a second executable portion that sets a maximum number of the plurality of encryption processing cores for processing only the decryption operations, thereby lowering the decryption latency;
- a third executable portion that assigns the decryption and encryption operations to each of the plurality of processing cores for processing if each of the plurality of encryption processing cores have attained the busy status;
- a fourth executable portion that classifies the decryption and encryption operations as one of at least three types of operations represented as encryption only operations (E), the decryption only operations (D), and decryption and encryption operations (D/E);
- a fifth executable portion that schedules the encryption operations, the decryption operations, and the decryption and encryption operations, between the pool of the plurality of encryption processing cores according to a thread weight value (TWV) that is assigned to each one of the plurality of encryption processing cores having a difference in processing power;

a sixth executable portion that allocates a minimal number of the plurality of encryption processing cores for processing the encryption operations, thereby increasing encryption latency, wherein upon reaching a throughput limit for the encryption operations that causes the minimal number of the plurality of encryption processing cores to reach a busy status, the minimal number of the plurality of encryption processing cores for processing the encryption operations is increased; and a seventh executable portion that sets a time-out period for a predetermined threshold period for processing the encryption operations, the decryption operations, and the decryption and encryption operations.

20. The computer program product of claim 19, further including an eighth executable portion that sustains a bandwidth of the encryption operations by measuring core idle time and a throughput limit.

21. The computer program product of claim 19, wherein the busy status represents those of the plurality of encryption processing cores that have processed at least one of the encryption operations, the decryption operations, and the decryption and encryption operations during the predetermined threshold period.

22. The computer program product of claim 19, further including an eighth executable portion that assigns only the decryption operations to the plurality of encryption processing cores having an idle status, wherein the idle status represents those of the plurality of encryption processing cores that have yet to process any of the encryption operations, the decryption operations, and the decryption and encryption operations during flail the predetermined threshold period.

23. The computer program product of claim 22, further including a ninth executable portion that determines whether each one of the plurality of encryption processing cores had one of the idle status and the busy status during a last-predetermined threshold period.

24. The computer program product of claim 19, further including an eighth executable portion that determines the maximum number of the plurality of encryption processing cores by counting, from a firstmost positioned, one of the plurality of encryption processing cores, and sequentially counting, until reaching a lastmost positioned one of the plurality of encryption processing cores, to include in the maximum number of the plurality of encryption processing cores to process the decryption operations.

25. The computer program product of claim 24, further including a ninth executable portion that determines the minimum number of the plurality of encryption processing cores by locating the lastmost positioned one of the plurality of encryption processing cores to process the encryption operations.

26. The computer program product of claim 25, further including a tenth executable portion that:
    if the lastmost positioned one of the plurality of encryption processing cores is determined to be in the busy status, and those of the plurality of encryption processing cores to the left of the lastmost positioned one of the plurality of encryption processing cores are in the idle status:
        permits one of the plurality of encryption processing cores that is to the immediate left of the lastmost positioned one of the plurality of compression to process the encryption operations.

27. The computer program product of claim 26, further including an eleventh executable portion that:
    if at least one or more of an nth number of lastmost positioned ones of the plurality of encryption processing cores are determined to be in the busy status, and all other of the plurality of encryption processing cores to the left of the at least one or more of the nth number of lastmost positioned ones of the plurality of encryption processing cores are in the idle status:
        permits an additional one of the at least one or more of the nth number of lastmost positioned ones of the plurality of encryption processing cores to process the encryption operations.

* * * * *